United States Patent [19]

Mansel-James

[11] Patent Number: 4,458,856

[45] Date of Patent: Jul. 10, 1984

[54] MECHANISM FOR WINDING A FLEXIBLE LINE IN A CLOSE-PACKED MONOLAYER ON A DRUM

[75] Inventor: Walter K. Mansel-James, Johannesburg, South Africa

[73] Assignee: Digicor (Proprietary) Limited, South Africa

[21] Appl. No.: 392,133

[22] Filed: Jun. 25, 1982

[30] Foreign Application Priority Data

Jun. 25, 1981 [ZA] South Africa ........................ 81/4311

[51] Int. Cl.³ ...................... B65H 57/00; B65H 55/00
[52] U.S. Cl. .................................. 242/107; 242/157.1; 33/138
[58] Field of Search ............... 242/107, 157.1; 33/126, 33/138, 139, 140; 73/321

[56] References Cited

U.S. PATENT DOCUMENTS

| | | |
|---|---|---|
| 1,659,160 | 2/1928 | Richards ............................ 242/107 |
| 2,506,583 | 5/1950 | Duerr, Jr. ............................ 242/107 |
| 2,629,261 | 7/1948 | McKinney ............................ 73/321 |
| 2,854,753 | 10/1958 | Caparros . |
| 3,566,477 | 3/1971 | Williams . |
| 3,780,440 | 12/1973 | Taylor . |
| 3,781,738 | 12/1973 | Rozelle . |
| 3,812,590 | 5/1974 | Nigg et al. . |
| 4,031,360 | 6/1977 | Soule, Jr. . |
| 4,092,780 | 6/1978 | Trethewey et al. . |
| 4,150,282 | 4/1979 | Aoki . |
| 4,164,816 | 8/1979 | Bergkvist . |

FOREIGN PATENT DOCUMENTS 1205234 9/1970 United Kingdom .
2017929 10/1979 United Kingdom ................. 33/138

Primary Examiner—Stuart S. Levy
Assistant Examiner—Lloyd D. Doigan
Attorney, Agent, or Firm—Roylance, Abrams, Berdo & Goodman

[57] ABSTRACT

A mechanism for forming a closely packed monolayer of flexible line for a tape measure includes a drum 2, a main spring for rotating the drum to wind on the line and a line guide comprising pivoted together members 15 and 16. The line guide is moved axially and radially with respect to the drum 2 by the tension in the line 5 acting on the grooved pulleys rotating about pivot points 18 and 19. Tension is maintained in the line adjacent the drum and in the line guide by a brake 8.

6 Claims, 4 Drawing Figures

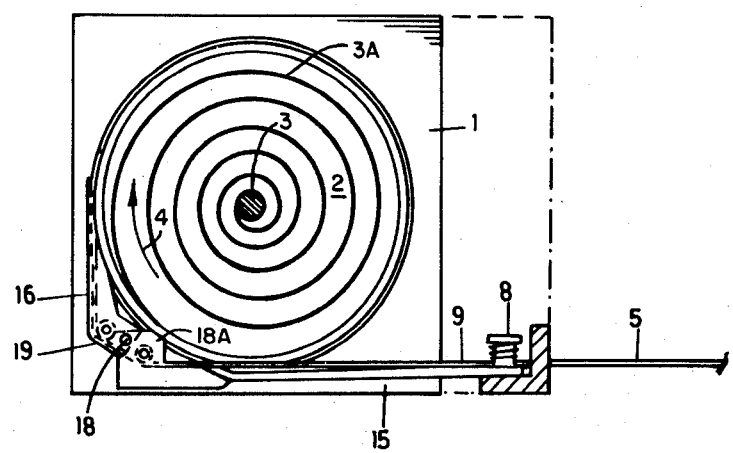
FIG_1
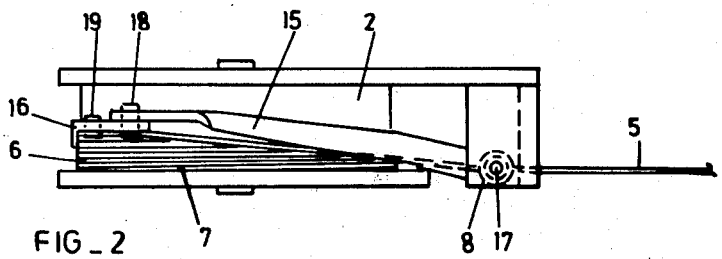
FIG_2
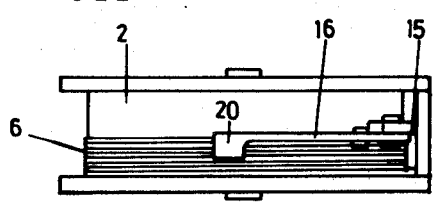
FIG_3
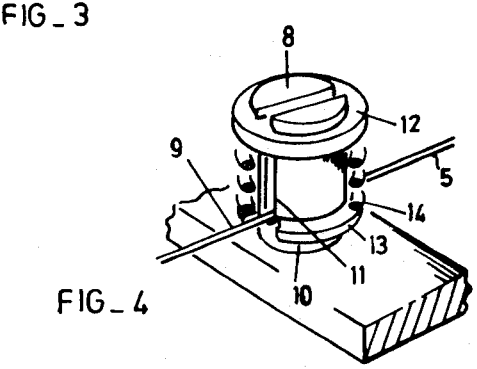
FIG_4

MECHANISM FOR WINDING A FLEXIBLE LINE IN A CLOSE-PACKED MONOLAYER ON A DRUM

FIELD OF THE INVENTION

This invention relates to a mechanism for winding a flexible line and a close packed monolayer on a drum. A primary intended use of the invention is in a pocket tape measure of the general type described in South African Patent No. 78/1440. However, the invention can be applied to a wide range of applications where for convenience or for purposes of relating drum rotation to length of wound and unwound line a close-packed monolayer is required on a drum.

BACKGROUND TO THE INVENTION

South African Patent No. 78/1440 describes a tape measure where the measuring line which can be extended from and retracted into a casing is wound in the form of a close packed monolayer on a drum. As the drum is rotated, electrical signals are generated indicative of the degree of rotation of the drum, and these signals produce a digital indication of the length of line pulled from the drum.

In order for the length of line pulled from the drum to be in a constant proportion to the angular rotation of the drum it is necessary for the line to be wound on the drum in a monolayer. If the monolayer is close packed, a maximum length of line can be stored on the drum.

Patent No. 78/1440 describes a mechanism which will ensure that the line is wound back on to the drum in a monolayer, but this mechanism is rather bulky and difficult to construct.

SUMMARY OF THE INVENTION

According to the invention there is provided a mechanism for releasably storing a length of flexible line comprising a drum onto which the line can be wound from one end thereof, a main spring arranged to rotate the drum in one direction to draw the line on to the drum, a line guide adjacent the surface of the drum and movable in an axial direction parallel to the rotational axis of the drum, and tensioning means arranged to restrain movement of the wire against the action of the main spring so that the line is always under tension in the line guide and positioned relative to the drum such that the line guide is biassed by the tension towards the surface and said one end of the drum and the line winds in a closely packed monolayer on to the drum.

The line guide may comprise at least two members pivotably connected end to end, the pivoting of the connection allowing the guide member to wrap around the surface of the drum.

The guide may be provided with one or more protrusions arranged to bear against the surface of the drum and the outer edge of the line on the drum which is at the time most remote from said one end of the drum.

The guide may be provided with one or more grooved pulleys adjacent the hinged connection or connections to act as the guides for the line.

A protrusion is arranged to be adjacent the pulley or adjacent each pulley.

In one embodiment the line guide comprises two hinged limbs, the first of the limbs being pivoted to a point on the base and the second of the limbs being hinged to the first limb. The line then passes around lugs or pulleys on each limb, the lugs being arranged so that the tension in the line tends to move the end of the first limb which is hinged to the second limb axially along the surface of the drum and simultaneously the free end of the second limb radially against the drum. The guide has one or more protrusions which ride against the edge of the coil of line the most remote from the anchored end of the line.

The lug or pulley around which the line passes on the first limb can conveniently be positioned on the hinge axis between the first and second limbs, or when two lugs are provided an equal distance each side of the hinge axis. Furthermore, the first limb may be cranked and its pivoted anchor suitably displaced in order that the tension in the line should always tend to move the first limb axially, irrespective of how small an amount of line is wound on the drum.

BRIEF DESCRIPTION OF THE DRAWINGS

The invention will now be further described, by way of example, with reference to the accompanying drawings, in which:

FIG. 1 is a plan view of a mechanism according to the invention;

FIG. 2 is a side view of the mechanism shown in FIG. 1;

FIG. 3 is an end view of the mechanism shown in FIG. 1; and

FIG. 4 is a perspective view of a small part of the mechanism shown in FIGS. 1 to 3.

DESCRIPTION OF A PREFERRED EMBODIMENT

The mechanism shown in the figures has a base 1 and a drum 2 mounted on the base for rotation about an axis 3. A main spring 3A is provided within the drum 2 to tend to turn the drum in the direction indicated by the arrow 4. A flexible line 5 is wound on the drum in the form of a close-packed monolayer 6 which is particularly clearly shown in FIG. 3. The line is attached at one end to the drum 2 at 7. As the line 5 is withdrawn from the drum 2, the main spring tightens so that the line 5 is always under tension. When the free end of the line is released, the spring winds the line back on the drum. A brake 8 is provided at an edge of the base 1 so that the portion 9 of the line 5 is always kept under tension even if the free end of the line 5 should suddenly be released. It is necessary to keep tension in at least the portion 9 of the line 5, because it is this tension which ensures the correct operation of the winding mechanism.

The brake 8 is shown more clearly in FIG. 4. A post 10 has a vertical slot 11 extending diametrically across it. The post 10 has an upper end portion of increased diameter, and a pair of washers 12, 13 separated by a spring 14 are retained beneath this upper end portion. The line 5 passes through the slot 11 between the washer 13 and the bottom of the slot 11. The spring 14 urges the lower washer 13 towards the bottom of the slot 11 to provide a frictional brake on the line 5.

Two hinged limbs 15 and 16 actually guide the line 5 on to the drum 2 in the necessary close-packed monolayer. As can be seen best in FIG. 2, the limb 15 is pivoted to the base 1 on a pivot axis 17. At its other end, the limb 15 has a hinge pin 18 by means of which the limbs 15 and 16 are hinged to one another allowing the limbs 15 and 16 in effect to wrap around the surface of the drum. Adjacent the hinge pin 18 is provided a grooved pulley, and the line 5 runs in the groove. Because of the relative positions of the brake 8 and the hinge pin 18, together with the cranked shape of the limb 15, the tension in the line 5 will always tend to pull the hinge pin 18 towards the one end of the drum and thus tend to pivot the limb 15 in an anti-clockwise direction as viewed in FIG. 2. It will become clear in the following that the movement of the limb 15 in this direction is limited by the limb 16 which rides on the uppermost turn of the close-packed monolayer 6.

The limb is freely hinged to the limb 15 about the axis of the pin 18. The limb 16 carries a grooved pulley 19 which is spaced from the axis of the pin 18. The line 5 also runs in a grooved pulley 19 and the tension in the line then pulls the free end of the limb 16 against the surface of the drum. The innermost edge of the limb 16, about half-way between the pulley 19 and the free end of the limb, rides on the uppermost turn of the close-packed monolayer 6. A protrusion 18A on the limb 15 also rides on the uppermost turn that is the turn most remote at the time from the one end of the drum 2. At the free end of the limb 16, there is a palm 20 which rides over the top few turns of the layer 6 and positions the line 5 as it is wound on to the drum in a position above the previous turn, to form the necessary close-packed monolayer.

With the mechanism described, the main spring which rotates the drum 2 provides the tension in the line 5 which operates the movement of the limbs 15 and 16. It will be clear from the drawings that the winding mechanism necessary to wind the line on to the drum 2 occupies very little space, which is a considerable advantage in a tape measure intended for pocket use.

It will be noted that whereas the line guide consists of two members 15 and 16 pivotably connected end to end, the guide may comprise three (or more) members pivotably connected end to end and biassed axially by the tension in the line as described. This line guide may have one or more extra surface bearing protrusions as required.

We claim:

1. A mechanism for releasably storing a length of flexible line comprising a drum on to which the line can be wound from one end thereof mounted for rotation about an axis on a body, a main spring fixed to the body arranged to rotate the drum in one rotational direction to draw the line on to the drum, a line guide pivotably supported on the body and lying adjacent the surface of the drum so as to be movable in an axial direction parallel to the rotational axis of the drum, and tensioning means arranged to restrain movement of the wire against rotation of the drum caused by action of the main spring so that the line is always under tension in the line guide, the tensioning means being mounted on the body and positioned axially at least opposite the one end of the drum such that the line guide is biased by the tension always towards said one end of the drum to wind the line in a closely packed monolayer on to the drum.

2. A mechanism according to claim 1, in which the line guide comprises at least two members pivotably connected end to end, the pivoting of the connection allowing the guide members to wrap around the surface of the drum.

3. A mechanism according to claim 1, in which the guide is provided with at least one protrusion arranged to bear against the surface of the drum and the outer edge of the line on the drum which is at the time most remote from said one end of the drum.

4. A mechanism according to claim 2, in which the guide is provided with at least one grooved pulley mounted thereon adjacent the hinged connection to act as the guide for the line.

5. A mechanism for releasably storing a flexible line comprising a drum mounted for rotation on a body and having the line wound therearound attached at one end to the drum, a main spring fixed to the body and positioned inside the drum arranged to rotate the drum in one rotational direction to draw the line on to the drum, tensioning means positioned at least opposite the position of the one end of the line on the drum arranged to keep the line under tension against the rotation of the drum due to the action of the main spring, a line guide comprising two members pivoted end to end, at least one guide means mounted on the members adjacent the connection therebetween through which the line passes and at least one protrusion extending from the line guide to bear against the surface of the drum and the extreme edge of the line at any time the most axially remote from the said one end of the line, and pivot means by which the line guide is attached to the body positioned such that the tension in the line urges the line guide towards the surface of the drum and in an axial direction parallel to the rotational axis of the drum towards said one end of the line.

6. A tape measure having a flexible line forming the measuring element thereof and including a mechanism for releasably storing the flexible line comprising a drum on to which the line can be wound from one end thereof mounted for rotation about an axis on a body, a main spring fixed to the body arranged to rotate the drum in one rotational direction to draw the line on to the drum, a line guide pivotably supported on the body and lying adjacent the surface of the drum so as to be movable in an axial direction parallel to the rotational axis of the drum, and tensioning means arranged to restrain movement of the wire against rotation of the drum caused by action of the main spring so that the line is always under tension in the line guide, the tensioning means being mounted on the body and positioned axially at least opposite the one end of the drum such that the line guide is biased by the tension always towards said one end of the drum to wind the line in a closely packed monolayer on to the drum.

* * * * *